United States Patent Office 3,199,850
Patented Aug. 10, 1965

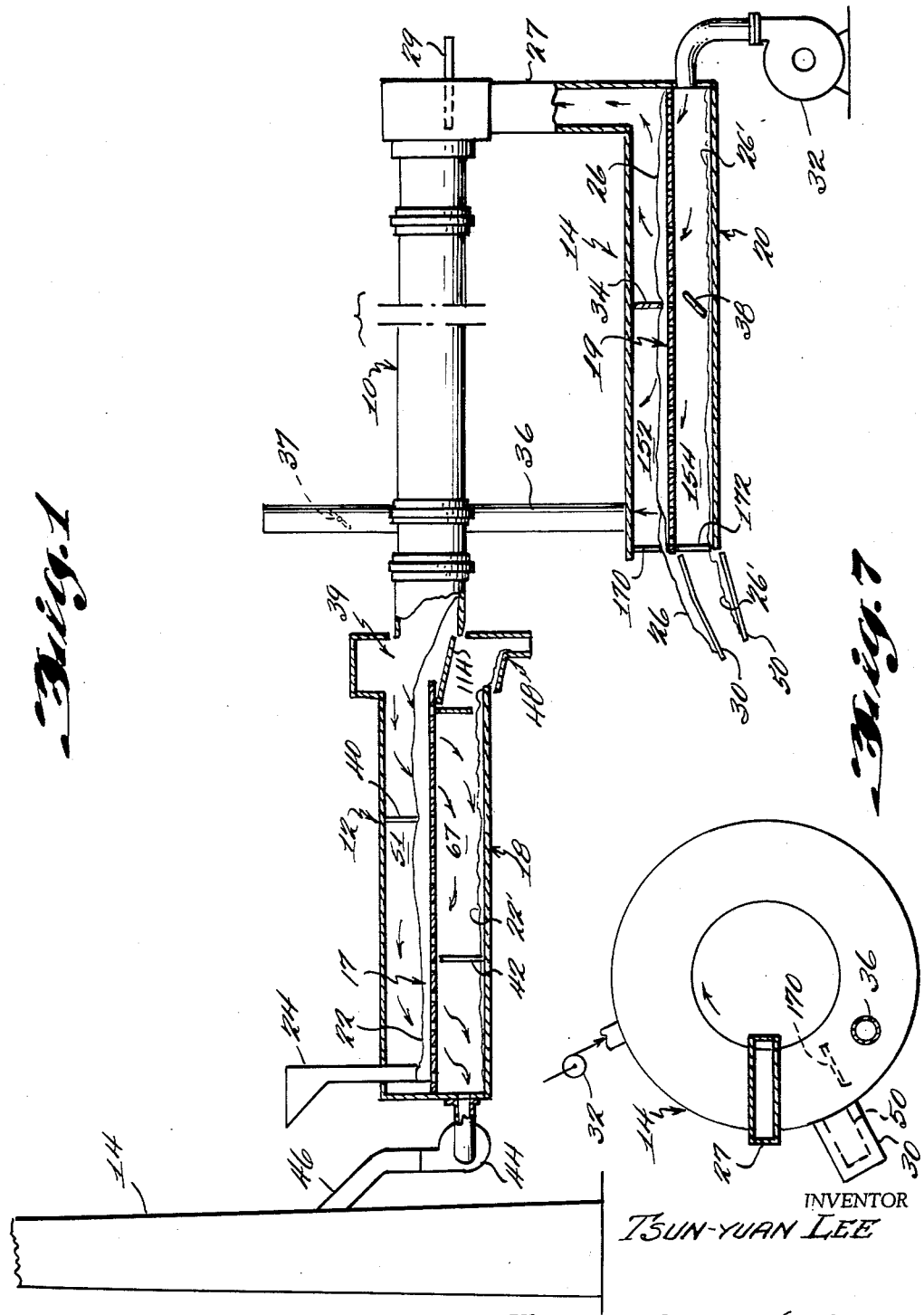

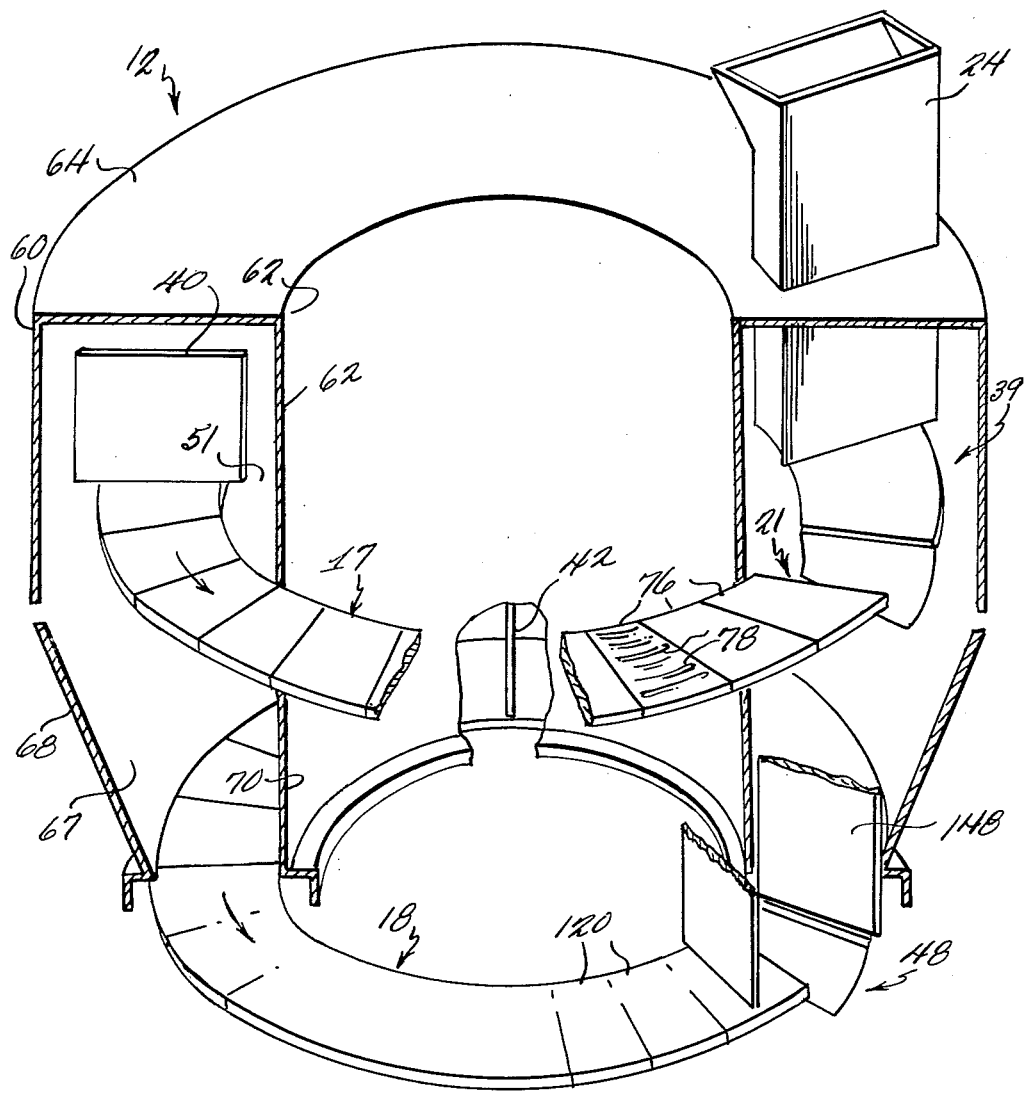
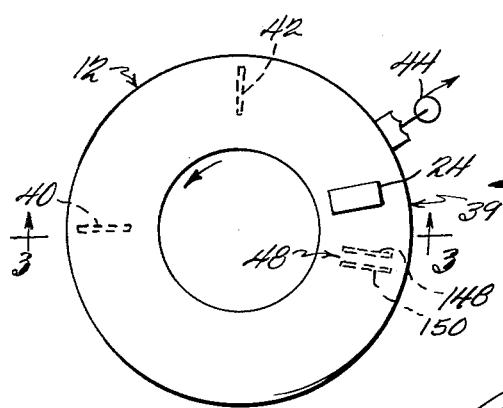

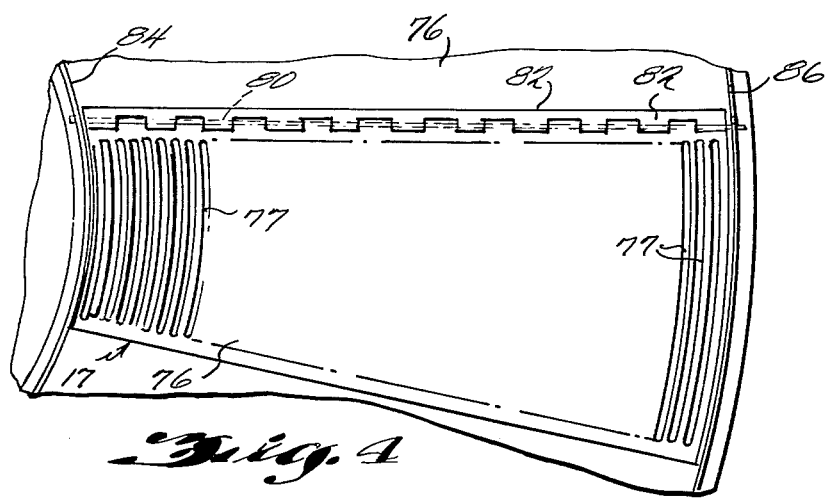

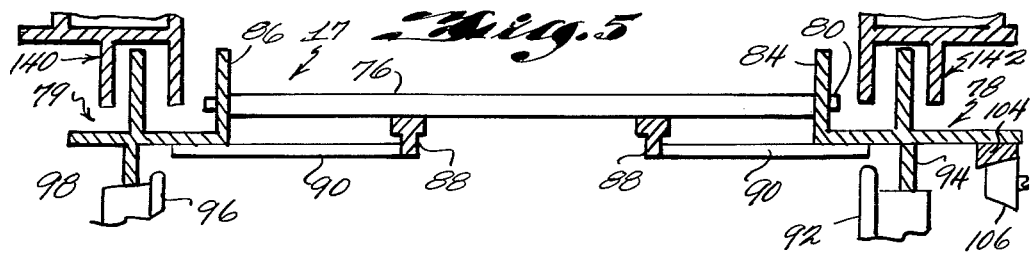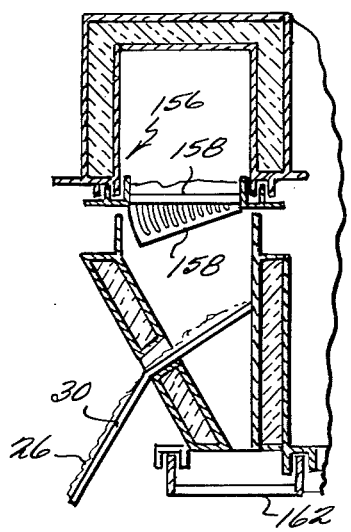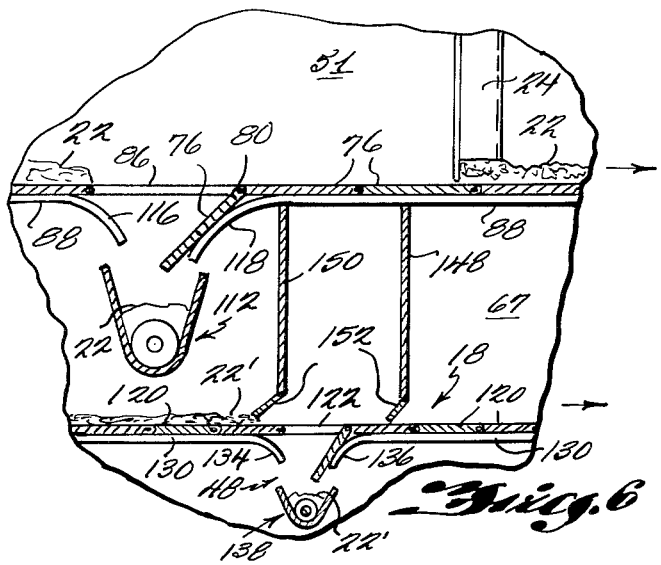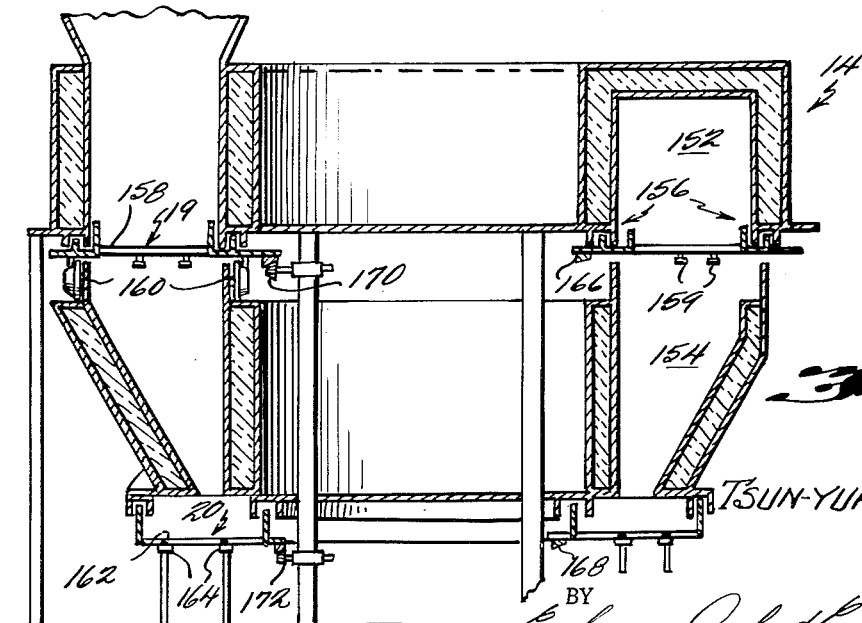

3,199,850
HEAT EXCHANGE FOR KILNS
Tsun-Yuan Lee, Allentown, Pa., assignor to Fuller Company, Catasauqua, Pa., a corporation of Delaware
Filed Oct. 14, 1963, Ser. No. 315,961
5 Claims. (Cl. 263—32)

This invention relates to heat exchange apparatus for contacting gases with granular solid material and in particular to feed preheaters and clinker coolers in which the solid material is carried on a horizontal rotatable grate and in which gas passes from a chamber on one side of the grate, through the material and the grate and into another chamber on the other side of the grate.

Broadly, the invention contemplates a compact, efficient heat exchanger including an annular, generally horizontal grate which defines the boundary between an upper annular chamber and a lower annular chamber. Solid granular material which may be, for example, cold raw material for a cement kiln or hot cement clinker from a kiln is deposited on top of the grate and is carried thereby to a discharge point. During the course of its travel the granular material is contacted with gases—hot kiln gases if the material is raw kiln feed or cold ambient air if the material is hot clinker. The gases may be delivered to either chamber and are caused to flow both vertically through the grate and the material thereon and circumferentially in both chambers by means of suitable partitions and baffles. At the same time fine particles pass downwardly through the grate and are collected on an impervious pan which rotates in the same direction as the grate. Preferably, both the grate and the pan are constructed of separate abutting sections which are hinged for rotation about axes radial to the axis of rotation. As each section passes the discharge point, the section is rotating about a horizontal axis so as to drop the material supported thereon into a screw conveyor, a chute or other device for carrying it away.

Another inventive feature of the preheater is the filtering, or dust collecting action of the bed of material carried by the grate on the dust carried into the device from the kiln. This effect is most pronounced in the feed area where the material is apt to be moist and thus effect a better filtering action.

A principal object of the present invention is to provide an efficient, compact heat exchanger for solid granular material having a rotatable material-conveying grate through which gas may pass in heat exchange relationship with the granular material;

Another object is to provide a heat exchanger of the above type having baffle and partition plates to direct the gas stream in a desired path through the grate;

Another object is to provide a heat exchanger of the above type which serves also to remove dust particles from the incoming gas stream;

A further object is to provide a heat exchanger having a horizontal, rotatable material-carrying pan which is constructed of hinged sections operable to dump the material carried thereon;

A still further object is to provide a heat exchanger for solid granular material having a rotatable material-carrying grate and a rotatable pan below the grate for retaining and conveying particles which pass through the grate onto the pan.

The invention will be further understood from the following detailed description of a kiln feed preheater and a clinker cooler in conjunction with the drawings in which:

FIGURE 1 is a schematic elevational view of a kiln embodying both a circular feed preheater and a circular clinker cooler, the preheater and cooler being shown cut away and developed as straight structures in order to illustrate the passage of material and gases therethrough;

FIGURE 2 is a schematic perspective view, partly cut away, of a preheater embodying the principles of the present invention;

FIGURE 2a is a schematic top plan view, on a reduced scale, of the preheater of FIGURE 2;

FIGURE 3 is a vertical sectional view of the preheater taken on the line 3—3 of FIGURE 2a;

FIGURE 4 is a fragmentary top plan view, on an enlarged scale, of the grate of FIGURES 2 and 3;

FIGURE 5 is an elevational view, on a enlarge scale, of the grate of FIGURES 2 and 3;

FIGURE 6 is a fragmentary elevational view of the dumping area of FIGURE 2;

FIGURE 7 is a schematic top plan view of a clinker cooler embodying the principles of the invention;

FIGURE 8 is a vertical sectional view of the cooler of FIGURE 7; and

FIGURE 9 is a fragmentary vertical sectional view of the dumping area of FIGURE 7.

Referring to FIGURE 1 there is shown schematically therein a cement clinker manufacturing system which includes a conventional inclined, rotating kiln 10, a raw material preheater 12, a cement clinker cooler 14 and a stack 16 for waste gases. The preheater 12 and cooler 14 are each constructed as an annular chamber having a horizontal rotatable grate therein and a horizontal rotatable pan disposed below the grate. However, in FIGURE 1 these elements are shown in a form which more readily illustrates the relative paths of solids and gases. Thus the preheater 12 and the cooler 14 illustrated in this figure are developed in straight lines by imagining that the annular elements have been cut and straightened. The preheater grate and pan are illustrated at 17 and 18, respectively, and the cooler grate and pan are illustrated at 19 and 20.

Raw material 22 enters the system through a hopper 24 located at the top of the preheater 12 and is carried by the preheater grate 17 to the discharge station 21 at the inlet end of the inclined kiln 10. Rotation of the kiln 10 about its longitudinal axis causes the raw material 22 to pass therethrough and be discharged through a duct 27 onto the cooler grate 19 as cement clinker 26. As is conventional, a heating device such as a pipe 29 is provided at the discharge end of the kiln for injecting a flame of burning gas or powdered coal to convert the raw material 22 to clinker 26. From the grate 19 of the cooler 14 the clinker 26 passes to a discharge chute 30.

Cooling air is drawn into the system by a blower 32 which forces the air into the clinker cooler 14 below the grate 19. The air then passes upwardly through the holes in the grate 19 and through the hot clinker 26. The space above the grate 19 is divided into two chambers by a vertical, transverse baffle 34 which is sealed to the top and sides of the cooler but which is spaced above the grate 19. The air which passes through the clinker 26 nearest the air inlet, i.e. to the right of the baffle 34 as viewed in FIGURE 1, passes upwardly through the duct 27 into the kiln 10. The air which passes through the clinker 26 near the clinker discharge point, i.e. to the left of the baffle 34, passes out a stack 36. A damper 37 in the stack 36 and another damper 38 below the grate 19 control the relative proportions of air which pass to the stack 36 and to the kiln 10.

The air which passes into the kiln 10, together with the gases formed by the combustion of the fuel from the source 29, are delivered to the raw material preheater 12 above the grate 17 at an inlet 39. A baffle 40 in the space above the grate 17 divides the space into two chambers, and another baffle 42 divides the space below the grate 17 into two chambers. A blower 44 draws the hot gases downwardly through the raw material near the kiln inlet, then upwardly and again downwardly near the raw material inlet and finally directs them to the stack 14 through a duct 46.

In both the preheater 12 and the cooler 14 some fine particles of solid material will pass through the grate onto the respective pan 18 or 20. These fines 22', in the case of the preheater, consist primarily of dust particles which are carried from the kiln by the gas stream and which are filtered out as the gas stream passes through the bed of raw material 22 on the grate 17. They are discharged at 48 and are utilized in any conventional manner such as by being returned to the kiln 10, either alone or in admixture, with raw material. In the case of the clinker cooler 14 the fines 26' are discharged from the pan 20 to a chute 50.

The actual construction of the preheater 12 will be better understood by referring to FIGURES 2–6. FIGURES 2 and 2a show schematically the relative position of the grate 17, the pan 18 and the various baffles and inlet and outlet points while the other figures show some of the mechanical details of construction. The exterior construction of the preheater 12 includes a double-walled upper annular chamber 51 supported from the ground by two concentric groups of circumferentially spaced, upstanding posts 52, 54. The outer group of posts 52 are secured at their upper ends to an outwardly extending annular flange 56 and the inner group of posts 54 are secured to a circular reinforcing plate 58. The sides and top of the upper chamber are defined by double outer walls 60, 60', double inner walls 62, 62' and double top walls 64, 64'. The spaces between the double walls are occupied by insulating material 66.

Below the upper preheater chamber 51 and separated therefrom by the rotatable, annular grate 17 is a lower annular chamber 67 defined by inclined outer double walls 68, 68' and vertical inner double walls 70, 70'. The outer walls 68, 68' are supported from the outer group of posts 52 by suitable inclined braces 72, and the inner walls 70, 70' are supported by the inner group of posts 54 by braces 74.

Intermediate the upper and lower chambers 51 and 57 is the grate 17 which includes a plurality of grate segments 76, each having a large number of thin slots 77 therethrough. The segments 76 are horizontally disposed in abutting relationship between two concentric frame members 78, 79 having generally L-shaped cross sections as seen in FIGURES 3 and 5. Each of the segments is hinged along its leading edge by means of a radial hinge pin 80 which passes through a bar 82 extending radially between and fixed to the upstanding flanges 84, 86 of the inner and outer frame members 78, 79 respectively. The grate segments 76 are normally held in a horizontal position by a pair of fixed concentric rails 88 which are disposed between the grate frame members below the segments 76. As seen in FIGURE 5, the rails 88 are supported by circumferentially spaced horizontal struts 90 secured to the grate frame members 78, 79.

The inner grate frame member 78 is supported by means of a plurality of circumferentially spaced wheels 92 which are journalled on a depending flange 94 for rotation about radial axes. Similarly, the outer frame member 79 is supported by a plurality of wheels 96 mounted on a depending flange 98. The wheels 92, 96 ride on horizontal circular plates 100, 102 secured to the upper edges of the side walls 68, 68' and 70, 70', as seen in FIGURE 3. Inwardly of its wheels 92 the inner frame member 78 is provided with a horizontal ring gear 104 which meshes with a motor driven pinion 106. The pinion is journalled on one of the posts 54 at 108 and is connected to a suitable motor (not shown) by a drive shaft 110 to rotate the grate 17 counterclockwise when viewed from the top.

The mechanism by which raw material on the preheater grate 17 is discharged to the kiln 10 is shown schematically in FIGURE 6. At the discharge station the rails 88 are interrupted so that as each grate segment 76 passes the space in the rail system it pivots by gravity about its pin 80 and deposits its load into a screw conveyor 112 located directly below. The conveyor 112 transfers the material to a downwardly inclined chute 114 (FIGURE 1) which extends into the kiln 10. Preferably, the leading ends of the rails 88 are provided at the discharge station with downwardly inclined guide portions 116 which allow the trailing edges of the grate segments 76 to drop smoothly. To absorb shock and to return the segments 76 to a horizontal position an upwardly inclined heavy leaf spring 118 is attached at one end to the trailing end of each rail 88.

The rotatable, imperforate pan 18 includes a plurality of imperforate segments 120 pivotally mounted between concentric inner and outer frame members 122, 124 in the same manner that the grate segments 76 are carried by the frame members 78, 79. The inner pan frame member 22 is driven in the same direction and at the same speed as the grate 17 by means of a ring gear 126 which meshes with a motor-driven pinion 128.

A pair of concentric rails 130 secured to the upper ends of a plurality of upstanding posts 1 support the segments 120 from below. Conveniently the rails 130 fit in grooves in the lower surface of the segments 120 so as to restrain lateral movement of the pan 18.

The pan 18 is dumped in the same manner as in the grate 17. Referring again to FIGURE 6, it will be seen that the rails 130 are interrupted at the discharge station 48, there being at this location a downwardly extending guide 134 for lowering each pan segment 120 smoothly and an upwardly extending leaf spring 136 for returning the segments 120 to a horizontal position. A screw conveyor 138 is disposed below the point at which the rails 130 are interrupted for receiving the fines 22'.

Referring again to FIGURES 3 and 5, it will be seen that the preheater chambers 51 and 67 are provided with labyrinth seals adjacent the grate 17 and the pan 18 for reducing escape of gases and dust to the atmosphere. As shown, these seals illustrated at 140 and 142 adjacent the grate 17 and at 144 and 146 adjacent the pan 18 consist of vertical flanges arranged alternately on the pan and grate frames and on the fixed elements. Adjacent flanges are closely spaced thereby providing resistance to the flow of gas from the preheater 12. The spaces are emphasized in the drawings for the purpose of clarity.

To prevent the hot gases entering the preheater 12 from bypassing parts of the grate 17 the lower chamber 67 is provided with a vertical transverse baffle 148 arranged immediately forward of the fines discharged station 48. Immediately to the rear of the discharge station 48 is another vertical transverse baffle 150. The lower edges of these and the other baffles are provided with flexible strips 152 of refractory material, such as asbestos cloth, which form a seal with the material or with the structural element below the baffles.

Referring to FIGURES 7, 8 and 9, it will be seen that the clinker cooler 14 is constructed in generally the same manner as the preheater 12. An upper annular chamber 152 is separated from a lower annular chamber 154 by the annular perforated grate 19 and by labyrinth seals 156. The grate 19, consisting of a plurality of segments 158 slidable on rails 159, is mounted between concentric frame members which are supported by circumferentially-spaced wheels 160. The imperforate pan 20, consisting of segments 162, is also mounted between concentric frame members and is slidable on rails 164. The inner frame members of both the grate and the pan are rotatably driven clockwise when viewed from the top by means of ring gears 166, 168 and pinions 170, 172.

The means for rotating the grate segments 158 and the pan segments 162 so as to dump the clinker 26 and clinker fines 26' onto the discharge chutes 30 and 50, respectively, include elements identical with the downwardly extending guides 116, 134 and upwardly extending springs 118, 136 shown in FIGURE 5. FIGURE 9 shows one of the grate segments 158 in its dumping position.

FIGURES 1 and 7 illustrate the relative positions of the inlets, outlets and baffles in the cooler 14. In addition to the baffle 34 which separates the upper chamber into two parts, there are two vertical transverse baffles 170 and 172 which prevent escape of cooling air at the points of discharging the clinker 26 and clinker fines 26'. The baffle 170 is located in the upper chamber 152 immediately to the rear, with respect to the direction of rotation of the grate and pan, of the clinker discharge point. The baffle 172 is located in the lower chamber 154 immediately to the rear of the clinker fines discharge point. While not shown in FIGURE 1, these baffles are preferably provided along their lower edges with flexible strips which form seals with the clinker material on top of the grate 19 or pan 20.

The overall operation of the raw material preheater 12 and clinker cooler 14 has been described above in general terms and is apparent from inspection of FIGURE 1. In the preheater 12 hot kiln gases make three vertical passes through the bulk of the raw material 22 while flowing in a countercurrent direction. Both the gas stream and the solids make only one pass through the preheater, the solids being continuously dumped as they approach 360° of rotation. In the cooler 14, the incoming cold air stream is divided into two streams each of which makes one vertical pass through the bulk of the clinker 26. By regulating the dampers 37 and 38 the relative volumes of the two air streams can be adjusted according to clinker output and clinker temperature to give optimum recovery of heat.

In addition to the high heat transfer obtained and consequent conservation of heat, the equipment of the present invention also reduces to a large extent the dust which normally must be removed from the kiln gases or cooling air before they are vented to the atmosphere. In both the preheater 12 and the cooler 14 the fine particles tend to sift through the grate and fall by gravity to the pan. The gas stream will, of course, tend to carry some of the particles in suspension as dust, but the relatively thick layer of raw material or clinker acts as a filter bed and removes a large proportion of the particles. This filtering action is particularly effective in the preheater 12 where the bed of raw material is likely to be relatively moist.

Thus it will be appreciated that the present invention provides an efficient, compact heat exchanger which is well suited for use in conjunction with cement or lime kilns. The equipment is not limited to this environment, however, and may be used wherever granular or pulverized solids are to be treated with gas either for heat exchange or chemical reaction purposes. While a specific embodiment of the invention has been described, modifications thereof will occur to those skilled in the art and it is therefore not intended that the described details be limiting except as they appear in hte appended claims.

What is claimed is:

1. Heat exchange apparatus for treating granular solid material with gases and for separating fine particles from the mass comprising: a horizontal annular casing; a generally horizontal annular rotatable grate within said casing dividing the latter into upper and lower chambers; means for rotating said grate about its central axis; inlet means associated with said casing for depositing a layer of granular solid material on the upper surface of said grate; means for discharging the granular solid material from said grate; a generally horizontal annular rotatable pan disposed at the bottom of said casing below and concentric with said grate; means for rotating said pan about its central axis; means for discharging granular solid from said pan; inlet means for introducing a stream of gas into one of said chambers; and outlet means for discharging a stream of gas from one of said chambers; and baffle means within said casing for directing the incoming gas stream transversely through said grate at least once.

2. Apparatus as in claim 1 wherein said gas inlet means is associated with said upper chamber at a location generally at said grate discharge means, wherein said gas outlet is associated with said lower chamber at a location forwardly of said solid material inlet means and wherein each of said chambers has at least one baffle arranged generally radial to the axis of rotation of said grate and said pan to cause incoming gas to flow downwardly through said grate at a location just rearwardly of said grate discharge means, then upwardly through said grate and then downwardly through said grate forwardly of said gas outlet, said forward and rearward locations being defined with respect to the direction of rotation of said grate.

3. Apparatus as in claim 1 wherein said gas inlet means is associated with said lower chamber at a location forwardly of said solid material inlet means, wherein said gas outlet means is associated with said upper chamber at a location generally at said solid material inlet means and wherein each of said chambers has at least one baffle arranged generally radial to the axis of rotation of said grate and said pan to cause incoming gas to flow horizontally through said lower chamber and at the same time upwardly through said grate, said forward and rearward directions being defined with respect to the direction of rotation of said grate.

4. Apparatus as in claim 3 further comprising a damper in said lower chamber forwardly of said gas inlet, an auxiliary gas outlet associated with said upper chamber rearwardly of said solid material inlet means, and a damper associated with said auxiliary gas outlet.

5. In combination: an inclined rotary kiln; a feed material preheater for delivering feed material to the higher end of said kiln; and a clinker cooler for receiving hot clinker from the lower end of said kiln; said preheater and said cooler each comprising a horizontal annular casing containing a horizontal rotatable grate which divides the interior of said casing into an upper chamber and a lower chamber and further comprising means for rotating the respective grate about its central axis; said preheater further including means for depositing granular feed material on top of the preheater grate, transfer means associated with said preheater casing for conducting hot kiln gases and kiln dust from the higher end of the kiln to said said upper preheater chamber and for passing preheated feed material from the grate to the higher end of the kiln, baffle means in said upper and lower preheater chambers for directing kiln gases downwardly through a first portion of the grate then upwardly through a second portion of the grate and then downwardly through a third portion of the grate whereby granular feed material on the grate will filter out fine dust particles from the kiln gases and will be heated by the kiln gases and outlet means associated with said lower preheater chamber for discharging kiln gases therefrom after having passed downwardly through the grate, said outlet means including a blower having an inlet end which communicates with said lower preheater chamber; said clinker cooler further including inlet means comprising a blower associated with said lower cooler chamber for forcing cooling air into the lower chamber and upwardly through the cooler grate, transfer means associated with said cooler casing above the cooler grate for receiving hot clinker from the lower end of said kiln and for passing preheated air to the lower end of said kiln, and discharge means for discharging cooled clinker from the cooler grate.

References Cited by the Examiner

UNITED STATES PATENTS

| | | | |
|---|---|---|---|
| 1,885,673 | 11/32 | Bartling | 34—187 X |
| 2,256,017 | 9/41 | Curran | 34—187 X |
| 2,750,272 | 6/56 | Lellep | 263—28 X |
| 2,955,991 | 10/60 | Tufty | 266—21 X |

FOREIGN PATENTS

| | | |
|---|---|---|
| 789,739 | 11/35 | France. |
| 730,685 | 3/53 | Great Britain. |

CHARLES SUKALO, *Primary Examiner.*

JOHN J. CAMBY, *Examiners.*